(12) United States Patent
Kawashima et al.

(10) Patent No.: US 8,260,119 B2
(45) Date of Patent: Sep. 4, 2012

(54) CONTENT EDITING APPARATUS

(75) Inventors: Takashi Kawashima, Osaka (JP); Osamu Yamaji, Osaka (JP)

(73) Assignee: Panasonic Corporation, Osaka (JP)

( * ) Notice: Subject to any disclaimer, the term of this patent is extended or adjusted under 35 U.S.C. 154(b) by 126 days.

(21) Appl. No.: 12/671,971

(22) PCT Filed: Jun. 9, 2009

(86) PCT No.: PCT/JP2009/002601
§ 371 (c)(1),
(2), (4) Date: Feb. 3, 2010

(87) PCT Pub. No.: WO2009/150827
PCT Pub. Date: Dec. 17, 2009

(65) Prior Publication Data
US 2011/0293238 A1 Dec. 1, 2011

(30) Foreign Application Priority Data
Jun. 10, 2008 (JP) .................................. 2008-151245

(51) Int. Cl.
- *G11B 27/00* (2006.01)
- *H04N 9/80* (2006.01)
- *H04N 5/93* (2006.01)

(52) U.S. Cl. ........................................ 386/278; 386/248
(58) Field of Classification Search ........................ None
See application file for complete search history.

(56) References Cited

U.S. PATENT DOCUMENTS

| | | | | |
|---|---|---|---|---|
| 5,539,527 A | * | 7/1996 | Kajimoto et al. | 386/278 |
| 6,154,600 A | * | 11/2000 | Newman et al. | 386/281 |
| 6,339,668 B1 | * | 1/2002 | Schmidt et al. | 386/281 |
| 6,606,451 B2 | * | 8/2003 | Honda et al. | 386/233 |

(Continued)

FOREIGN PATENT DOCUMENTS

JP 9-107517 4/1997

(Continued)

OTHER PUBLICATIONS

International Search Report issued Aug. 18, 2009 in corresponding International Application No. PCT/JP2009/002601.

*Primary Examiner* — William C Vaughn, Jr.
*Assistant Examiner* — Gelek W Topgyal
(74) *Attorney, Agent, or Firm* — Wenderoth, Lind & Ponack, L.L.P.

(57) ABSTRACT

Provided is a content editing apparatus which, while selecting and deselecting a plurality of contents, edits the plurality of contents such that selected contents are appropriately associated with each other so as to be simultaneously reproduced. Moving image shooting information which identifies a shooting time of a moving image content, individual shooting information which indicates shooting times of a plurality of other contents, and the moving image content, are acquired. The moving image content is reproduced and displayed. A moving image shooting time corresponding to the moving image content is outputted based on the moving image shooting information, and such individual shooting information that an individual time indicated by the individual shooting information is within a predetermined time period including the outputted moving image shooting time, is retrieved. When the individual shooting information is retrieved, the reproduction of the moving image content is paused, and a user is made select whether or not an other content, which corresponds to each of the retrieved individual shooting information, is to be displayed in link with the moving image content. An other content selected to be displayed in link is acquired, and stored in association with the moving image content, together with information indicating a time for a link display.

10 Claims, 8 Drawing Sheets

U.S. PATENT DOCUMENTS

| | | | |
|---|---|---|---|
| 7,119,814 B2 * | 10/2006 | Meron et al. | 345/619 |
| 7,970,263 B1 * | 6/2011 | Asch | 386/350 |
| 2002/0171669 A1 * | 11/2002 | Meron et al. | 345/619 |
| 2008/0052742 A1 * | 2/2008 | Kopf et al. | 725/34 |

FOREIGN PATENT DOCUMENTS

| | | |
|---|---|---|
| JP | 2002-158948 | 5/2002 |
| JP | 2004-173083 | 6/2004 |
| JP | 2007-295316 | 11/2007 |

* cited by examiner

FIG. 2

| SHOT MOVING IMAGE NAME | SHOOTING START DATE/TIME | SHOOTING END DATE/TIME | SHOOTING POINT |
|---|---|---|---|
| MOVING IMAGE1 | 09.4.1/10:20:05 | 09.4.1/11:30:32 | 4807.03,N 1131.32,E |
| MOVING IMAGE2 | 09.4.5/16:31:21 | 09.4.5/16:42:50 | 4857.55,N 1231.26,E |
| MOVING IMAGE3 | 09.4.9/20:22:36 | 09.4.9/20:46:16 | 4901.52,N 1162.55,E |

FIG. 3

| SHOT IMAGE NAME | SHOOTING DATE/TIME | SHOOTING POINT | SHOOTING DEVICE |
|---|---|---|---|
| STILL IMAGE1 | 09.4.1/10:22:10 | 4807.03,N 1131.32,E | IMAGING DEVICE200 |
| STILL IMAGE2 | 09.4.1/10:51:15 | 4807.03,N 1131.32,E | IMAGING DEVICE300 |
| STILL IMAGE3 | 09.4.1/10:51:16 | 4807.03,N 1131.32,E | IMAGING DEVICE300 |
| STILL IMAGE4 | 09.4.1/17:11:23 | 4857.55,N 1231.26,E | IMAGING DEVICE200 |

| SHOT MOVING IMAGE NAME | LINK TIME | CONTENT TO BE LINKED |
|---|---|---|
| MOVING IMAGE1 | 00:02:05 | IMAGING DEVICE200、STILL IMAGE1 |
| MOVING IMAGE1 | 00:31:10 | IMAGING DEVICE300、STILL IMAGE2 |
| MOVING IMAGE1 | 00:31:10 | IMAGING DEVICE300、STILL IMAGE3 |

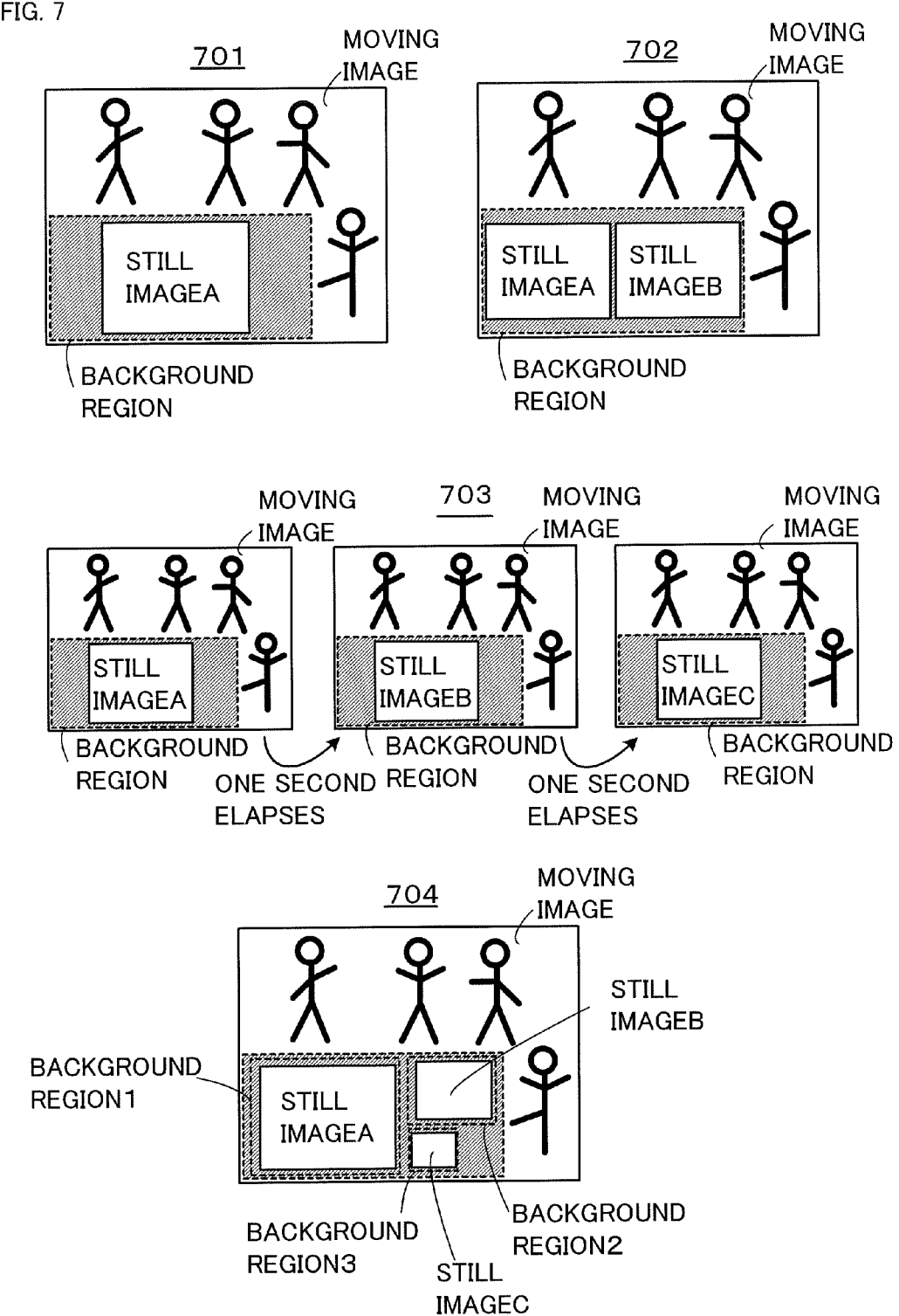

FIG. 8

| SHOT MOVING IMAGE NAME | LINK TIME | CONTENT TO BE LINKED | PERMISSION FOR LINK | DISPLAY PATTERN | BACKGROUND REGION |
|---|---|---|---|---|---|
| MOVING IMAGE1 | 00:02:05 | IMAGING DEVICE200, STILL IMAGE1 | ○ | REPRODUCTION WITH OVERLAP | (0,600)~(800,1500) |
| MOVING IMAGE1 | 00:31:10 | IMAGING DEVICE300, STILL IMAGE2 | ○ | REPRODUCTION WITH SIZE REDUCTION | (0,800)~(900,1500) |
| MOVING IMAGE1 | 00:31:10 | IMAGING DEVICE300, STILL IMAGE3 | ○ | REPRODUCTION WITH SIZE REDUCTION | (0,800)~(900,1500) |
| MOVING IMAGE1 | 00:31:10 | IMAGING DEVICE200, STILL IMAGE4 | × | — | — |

CONTENT EDITING APPARATUS

TECHNICAL FIELD

The present invention relates to a content editing apparatus which edits a plurality of related contents such as a moving image and a still image, such that the plurality of related contents are simultaneously displayed on the same screen.

BACKGROUND ART

In recent years, an imaging device such as a digital video camera and a digital still camera is spreading remarkably, and an occurrence of a situation in which a plurality of imaging devices shoot one object at the same time, is increasing. As a specific example of the situation, in a foot race in an athletic meet of an elementary school: a father shoots, from a short distance away, a moving image from a start to a goal with a video camera; simultaneously, a mother positioned in a public audience seat which is placed near a starting point continuously shoots, from a quite close position, still images at the time of the start with a still camera; and a grandparent, positioned in a seniors' spectator seat which is placed in front of the goal, shoots the moment of the goal with a camera built into a mobile phone.

On the other hand, a user of a him type camera often carefully selects a time of shooting and releases a shutter, because a film is wasted if the shooting fails. However, in a shooting with a digital camera, even if the shooting fails, data may be deleted. Therefore, when the shooting fails, little loss occurs, as compared with the film type camera. Moreover, many of recent digital cameras can continuously shoot approximately a few hundred images without changing a storage medium such as a memory card, and it is becoming general to shoot a large number of images of the same scene at one time, using a continuous shooting function or the like. Thus, a user can shoot a plurality of images of the same scene without hesitation, and later, can select preferred data.

In a case where the above-described shooting is performed, a large number of contents of moving images and still images including the same scene are stored. In most cases, a photographer of each imaging device selects data he/she prefers and thus organizes the contents, and the contents are printed out, or labeled with a title and the like to be managed for a permanent collection so that the data can be repeatedly viewed.

However, in a case where there are a plurality of imaging devices that shot the same scene, a plurality of contents which are organized in the respective imaging devices co-exist. This causes a great inconvenience because it is necessary that the contents in one of the imaging devices are reproduced separately from the contents in another of the imaging devices when the contents are viewed later. Therefore, many users are desiring an appearance of a technique for efficiently selecting and deselecting a plurality of contents or efficiently viewing a plurality of related contents.

As a conventional technique for efficiently displaying a plurality of related contents, disclosed is an image display system in which: when a DVC device and a memory card are connected to a TV device while a TV broadcast program is being viewed, whether or not there are related scenes that were shot within the same time period, in images recorded in the DVC device and the memory card, is determined by comparing shooting times; and when there are related scenes, a "tied string icon" is displayed on a screen on which the TV broadcast is being reproduced, so that a TV viewer can recognize that the contents of the two connected devices are related to each other (see Patent Literature 1, paragraph 0126). In addition, in the image display system, when the TV viewer selects the "tied string icon", a linked thumbnail image display screen, which displays a list of thumbnail screens of still images recorded in the memory card being associated with a video scene icon indicating a moving image recorded in the DVC device, is displayed (see Patent Literature 1, paragraphs 0128 to 0131).

CITATION LIST

Patent Literature

Patent Literature 1: Japanese Laid-Open Patent Publication No. 2002-158948

SUMMARY OF INVENTION

Technical Problem

However, the image display system of Patent Literature 1 merely assists a user in performing an operation of selecting a viewing object, and thus has no difference from a conventional technique in terms of requiring a separate reproduction of individual contents. Moreover, in the image display system of Patent Literature 1, the respective contents to be viewed have to be selected and deselected preliminarily by a photographer of each imaging device, and no consideration is made for efficiently selecting and deselecting, and organizing a plurality of contents.

For example, for efficiently displaying a plurality of related contents, a method is conceivable in which a plurality of contents are, while being selected and deselected, edited such that selected contents are appropriately associated with each other so as to be simultaneously reproduced, in order that a plurality of related contents can be simultaneously viewed as one collective content.

Accordingly, an objective of the present invention is to provide a content editing apparatus, a content editing method, and a content editing program, in which a plurality of contents are, while being selected and deselected, edited such that selected contents are appropriately associated with each other so as to be simultaneously reproduced, in order that contents having the same object can be simultaneously viewed as one collective content.

Solution to Problem

The present invention is directed to a content editing apparatus. To achieve the above objective, the content editing apparatus of the present invention is a content editing apparatus which preliminarily associates an other content with a moving image content in an editing process, such that the other content is displayed in link with the moving image content in a normal reproduction of the moving image content. The content editing apparatus includes: an acquisition section that acquires, for the editing process, moving image shooting information which at least identifies a time at which the moving image content was shot, individual shooting information which at least indicates a time at which each of a plurality of other contents which are candidates for a link display was shot, and the moving image content; a moving image reproduction control section that, for the editing process, reproduces the moving image content acquired by the acquisition section, and causes the moving image content to be displayed on a display device which is provided in the outside and connected to the content editing apparatus, or is built in the content editing apparatus; a time output section that outputs a moving image shooting time corresponding to the moving image content reproduced by the moving image reproduction control section, based on the moving image shooting information acquired by the acquisition section; a retrieval section that retrieves, from the individual shooting information acquired by the acquisition section, such individual shooting information that an individual time indicated by the individual shooting information is within a predetermined time period including the moving image shooting time outputted by the time output section; a selection request section that: pauses, at a time for a link display, the reproduction of the moving image content reproduced by the moving image reproduction control section, when one or more individual shooting information is retrieved by the retrieval section; makes a user select whether or not an other content, which corresponds to each of the retrieved one or more individual shooting information, is to be displayed in link with the moving image content in the normal reproduction of the moving image content; and releases the pause after whether or not a link display is to be performed is determined for all other contents corresponding to the individual shooting time information retrieved by the retrieval section; and a storage section that acquires an other content selected to be displayed in link by the selection request section, and stores the other content in association with the moving image content, together with information indicating the time for a link display.

It is preferred that, when the number of individual shooting information retrieved in a retrieval for one predetermined time period reaches a specified value, the retrieval section: terminates the retrieval at that point of time; sets the predetermined time period to be a time period corresponding to a time range for which the retrieval has been performed by then; and proceeds with a subsequent retrieval.

It is preferred that: an external device that records the other content and includes an own display section is communicably connected to the content editing apparatus; the acquisition section acquires the individual shooting information from the external device; the selection request section: transmits, to the external device, control information for displaying, on the display section included in the external device, an image for which a selection of whether or not a link display is to be performed is requested, and a corresponding other content; and receives, from the external device, selection information indicating a result of the selection, which is performed by a user of the external device based on the control information, of whether or not a link display is to be performed: and the storage section acquires the other content selected to be displayed in link, from the external device.

It is preferred that: the acquisition section further acquires, for the normal reproduction, the moving image content with which the other content is associated together with the information indicating the time for a link display; the moving image reproduction control section further reproduces the moving image content and causes the display device to display the moving image content, for the normal reproduction; and the content editing apparatus further includes: a time detection section that detects a time for a link display, based on the acquired information indicating the time for a link display, while counting a reproduction time of the moving image content which is in the normal reproduction by the moving image reproduction control section; and an image synthesis section that, at the time for a link display detected by the time detection section, synthesizes the other content, which is stored in association with the corresponding moving image shooting time, and the moving image content, which is subjected to the normal reproduction by the moving image reproduction control section; and displays the other content and the moving image content in link with each other on the same screen of the display device, for a predetermined time period.

It is preferred that the image synthesis section estimates a background region in the moving image content to be synthesized, which is in the normal reproduction, and puts the other content to be synthesized, in the background region.

It is preferred that the image synthesis section puts the other content to be synthesized, while adjusting the size of the other content to be synthesized, such that the size of the other content does not exceed the size of the background region.

It is preferred that, when there are concurrently a plurality of other contents to be synthesized, the image synthesis section puts the other contents to be synthesized, while switching the other contents at constant time intervals using a time division, such that the size of the other contents does not exceed the size of the background region.

It is preferred that, when there are concurrently a plurality of other contents to be synthesized, the image synthesis section: divides the background region into a plurality of regions of which the number is equal to the number of the other contents to be synthesized; and puts the other contents to be synthesized, in the divided regions, respectively.

Moreover, to achieve the above objective, the content editing method of the present invention is a content editing method in a content editing apparatus which preliminarily associates an other content with a moving image content in an editing process, such that the other content is displayed in link with the moving image content in a normal reproduction of the moving image content. The content editing method includes: an acquisition step of acquiring, for the editing process, moving image shooting information which at least identifies a time at which the moving image content was shot, individual shooting information which at least indicates a time at which each of a plurality of other contents which are candidates for a link display was shot, and the moving image content; a moving image reproduction control step of, for the editing process, reproducing the moving image content acquired in the acquisition step, and causing the moving image content to be displayed on a display device which is provided in the outside and connected to the content editing apparatus, or is built in the content editing apparatus; a time output step of outputting a moving image shooting time corresponding to the moving image content reproduced in the moving image reproduction control step, based on the moving image shooting information acquired in the acquisition step; a retrieval step of retrieving, from the individual shooting information acquired in the acquisition step, such individual shooting information that an individual time indicated by the individual shooting information is within a predetermined time period including the moving image shooting time outputted in the time output step; a selection request step of: pausing, at a time for a link display, the reproduction of the moving image content reproduced in the moving image reproduction control step, when one or more individual shooting information is retrieved in the retrieval step; making a user select whether or not an other content, which corresponds to each of the retrieved one or more individual shooting information, is to be displayed in link with the moving image content in the normal reproduction of the moving image content; and releasing the pause after whether or not a link display is to be performed is determined for all other contents corresponding to individual time information retrieved in the retrieval step; and a storage step of acquiring an other content selected to be displayed in link in the selection request step, and storing the other content in association with the moving image content, together with information indicating the time for a link display.

Furthermore, to achieve the above objective, the content editing program of the present invention is a content editing program executable by a content editing apparatus which preliminarily associates an other content with a moving image content in an editing process, such that the other content is displayed in link with the moving image content in a normal reproduction of the moving image content. The content editing program causes the content editing apparatus to perform: an acquisition step of acquiring, for the editing process, moving image shooting information which at least identifies a time at which the moving image content was shot, individual shooting information which at least indicates a time at which each of a plurality of other contents which are candidates for a link display was shot, and the moving image content; a moving image reproduction control step of, for the editing process, reproducing the moving image content acquired in the acquisition step, and causing the moving image content to be displayed on a display device which is provided in the outside and connected to the content editing apparatus, or is built in the content editing apparatus; a time output step of outputting a moving image shooting time corresponding to the moving image content reproduced in the moving image reproduction control step, based on the moving image shooting information acquired in the acquisition step; a retrieval step of retrieving, from the individual shooting information acquired in the acquisition step, such individual shooting information that an individual time indicated by the individual shooting information is within a predetermined time period including the moving image shooting time outputted in the time output step; a selection request step of: pausing, at a time for a link display, the reproduction of the moving image content reproduced in the moving image reproduction control step, when one or more individual shooting information is retrieved in the retrieval step; making a user select whether or not an other content, which corresponds to each of the retrieved one or more individual shooting information, is to be displayed in link with the moving image content in the normal reproduction of the moving image content; and releasing the pause after whether or not a link display is to be performed is determined for all other contents corresponding to individual time information retrieved in the retrieval step; and a storage step of acquiring an other content selected to be displayed in link in the selection request step, and storing the other content in association with the moving image content, together with information indicating the time for a link display.

Advantageous Effects of Invention

As above, in the present invention, a plurality of contents are, while being selected and deselected, edited such that selected contents are appropriately associated with each other so as to be simultaneously reproduced, in order that contents including the same object can be simultaneously viewed as one collective content. Therefore, a plurality of contents can be efficiently edited and efficiently viewed, which provides excellent usability.

In addition, a content editing apparatus according to a first embodiment inquires of an external device about whether or not a link display can be performed, and unless a permission is obtained from the external device, the content editing apparatus does not display, on a main body of the editing apparatus, a content which is a candidate for a link display. This enables an edit operation to be performed with a sense of security in consideration of the privacy of each individual. For example, in a case where a photographer hopes to avoid being laughed at for a badly shot photograph, a case where contents including different objects were shot at the same time, and a case where a highly-confidential content which causes a disadvantage when seen by someone is managed, a manager such as a photographer and an authorized person can responsibly make a final determination of whether or not a link display can be performed. This provides a great utility.

Moreover, in the present invention, all of a plurality of contents that were shot within a time period including a moving image shooting time are retrieved, and are collectively edited while a moving image content is paused. Therefore, an appropriate content can be efficiently selected from a plurality of contents and displayed in link, without frequently pausing the moving image content which is being reproduced.

Furthermore, a display of the reproduced content at the link time is analyzed and a link display pattern is determined. Thereby, in a reproduction process using a link display of a plurality of contents, an optimal link display pattern can be adopted. This can avoid a display manner that makes it difficult for a user to view a content.

BRIEF DESCRIPTION OF DRAWINGS

FIG. 2 shows an example of moving image shooting information.

FIG. 3 shows an example of individual shooting information.

FIG. 7 shows display patterns.

FIG. 8 shows an example of the mash-up content control data, in a case where the background region is extracted and a display pattern is determined during an editing process.

DESCRIPTION OF EMBODIMENTS

First Embodiment

Outline

In the present embodiment, a plurality of contents are, while being selected and deselected, edited such that selected contents are appropriately associated with each other so as to be simultaneously reproduced, in order that a plurality of related contents can be efficiently displayed and viewed later. More specifically, while a main moving image content, which forms a main base of an image synthesis, is reproduced, an operation is repeated in which: a time of shooting is monitored; if there are sub-contents such as still images and short moving images which were shot at the same time when the moving image content was shot, a plurality of sub-contents which were shot at times close to each other are subjected to an editing process together; and the reproduction of the main moving image content is paused, and whether or not an image synthesis is required is selected at a terminal from which the sub-content is provided. In a normal reproduction, the sub-content associated with the main moving image content is put in a background region of the main moving image content.

<Configuration>

Figure 1:
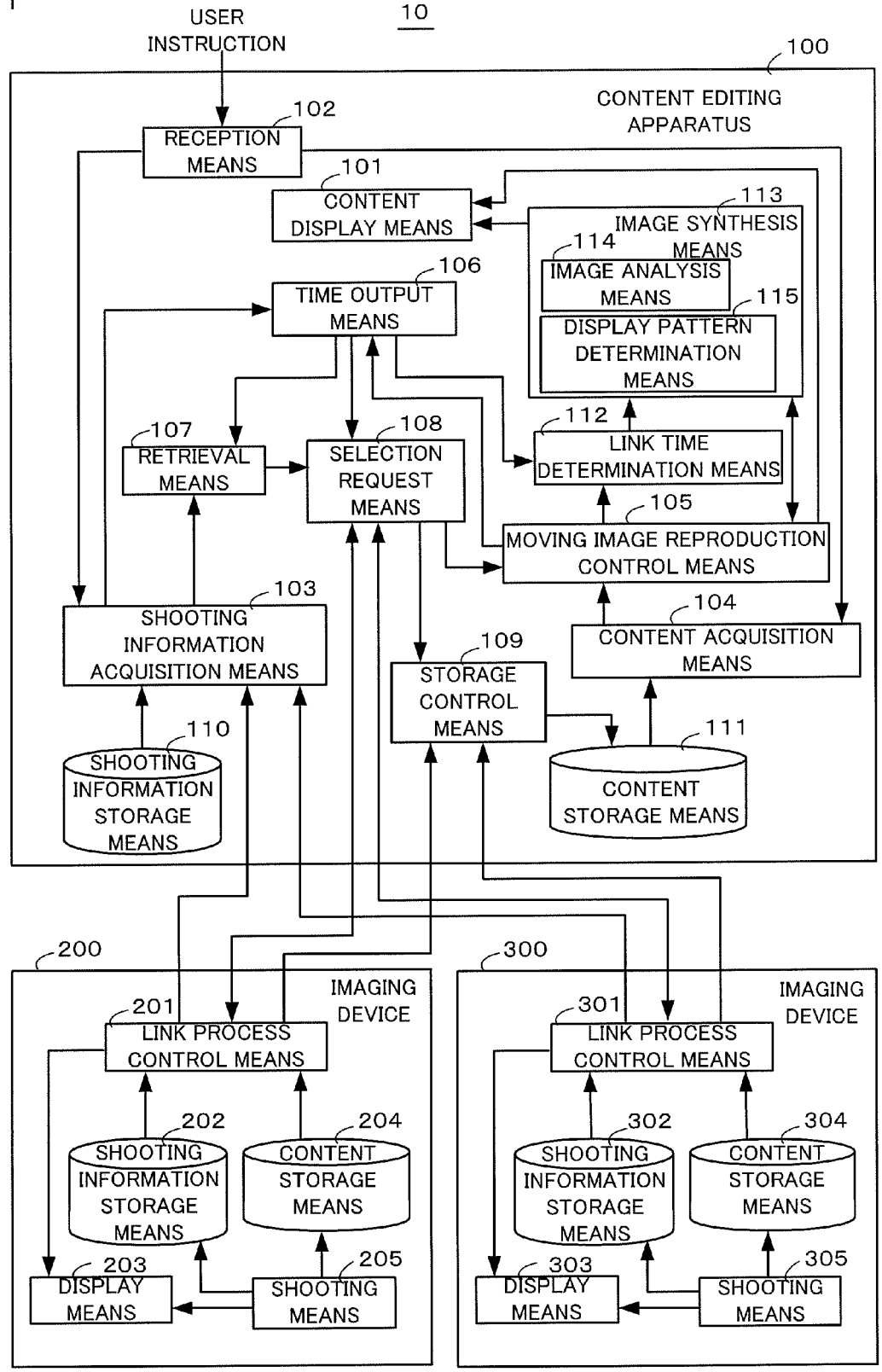
FIG. 1 is a schematic diagram showing an overall configuration of a content editing system 10 according to the present invention.

FIG. 1 is a schematic diagram showing an overall configuration of a content editing system 10 according to the present invention.

As shown in FIG. 1, the content editing system 10 includes a content editing apparatus 100, an imaging device 200, and an imaging device 300. Here, the imaging device 200 and the imaging device 300 are, under normal circumstances, used independently of the content editing apparatus 100. Only in an editing operation, the content editing apparatus 100 and the imaging device 200 are communicably connected to each other, and the content editing apparatus 100 and the imaging device 300 are communicably connected to each other. The content editing apparatus 100 and the imaging device 200, and the content editing apparatus 100 and the imaging device 300, may be locally connected to each other directly by a wire, or may be connected by local wireless communication such as wireless LAN or by global communication such as internet. In addition, transmission and reception of data may be realized by a memory card having shooting information or a content stored therein being directly connected to the content editing apparatus 100.

The content editing apparatus 100 is an apparatus having both of: a content editing function to realize a sequence of operations for preliminarily associating the moving image content with an other content such that the other content can be displayed in link with the moving image content during the normal reproduction of the moving image content; and a link display control function to synthesize the moving image content and the other content based on the association and to display a result of the synthesis. The content editing apparatus 100 includes content display means 101, reception means 102, shooting information acquisition means 103, content acquisition means 104, moving image reproduction control means 105, time output means 106, retrieval means 107, selection request means 108, storage control means 109, shooting information storage means 110, content storage means 111, link time determination means 112, and image synthesis means 113. Since the content editing apparatus 100 does not require much portability, an actual shape of the content editing apparatus 100 is assumed to be the shape of a stationary set of an apparatus and a monitor. However, the shape is not particularly limited thereto. For example, the set may be incorporated in another equipment such as a television or a set top box and thereby a function to receive an image of a television broadcast program may further be provided. Alternatively, the content display means 101 may be an independent display device which is provided as a separate member. Alternatively, the content editing apparatus 100 may be realized by software for realizing the functions of the content editing apparatus 100 being stored and executed in a general computer or the like.

The imaging device 200 is a portable device such as a digital still camera, a digital video camera, and a mobile phone with a camera, which has both of: a shooting function to shoot and store a moving image or a still image; and a part of an editing function to select whether or not a content (the still image or the moving image) obtained by the shooting function or the like is to be provided and displayed in link, in response to a request from the content editing apparatus 100. The imaging device 200 includes link process control means 201, shooting information storage means 202, display means 203, content storage means 204, and shooting means 205. As the imaging device 200, a special portable device having the shooting function is assumed. However, the imaging device 200 is not particularly limited thereto, and may be any device as long as the device stores therein some content, for example. Therefore, the imaging device 200 may not have the shooting means 205. Alternatively, the imaging device 200 may be realized by software for realizing the functions of the imaging device 200 being stored and executed in a mobile phone, a handheld game apparatus, an electronic notebook, a notebook personal computer, or the like, which are existing.

The imaging device 300 is a device having the same characteristics as those of the imaging device 200, and includes link process control means 301, shooting information storage means 302, display means 303, content storage means 304, and shooting means 305. Here, each of the component parts of the imaging device 300 is the same as the component part of the imaging device 200 that is referred to under the common name, and therefore a description thereof is omitted.

In addition, in the following, a situation in which transmission and reception are performed between the content editing apparatus 100 and the imaging device 200 will be mainly described. However, there is no superiority or inferiority between the imaging device 200 and the imaging device 300. The imaging device 200 and the imaging device 300 are identified based on imaging device identification information, and function in the same manner. Here, the imaging device identification information is, for example, an ID such as an apparatus name or an identification number of the imaging device.

Each content is given content identification information for uniquely identifying the content, and each information includes the identification information of the corresponding content. Therefore, correspondence between each information and each content can be clearly determined. Here, the content identification information is, for example, an ID such as a file name (a name of a shot image or a name of a shot moving image) or an identification number of a content.

The content display means 101 is a display device such as a liquid crystal display panel. In accordance with a control performed by the moving image reproduction control means 105 and the like, the content display means 101 displays not only a moving image content or a still image content, but also all kinds of images such as operation menus or an alarm display.

The reception means 102: receives, from an operator of the content editing apparatus 100, an edit instruction for an arbitrary moving image content, which has the content identification information attached thereto, a normal reproduction instruction, and the like; and starts each process.

Firstly, a description will be given of an operation of each component part in a case where the reception means 102 receives the edit instruction.

When the reception means 102 receives an edit instruction for a certain moving image content, the shooting information acquisition means 103: acquires, from the shooting information storage means 110, moving image shooting information which enables identification of a situation in which the moving image content was shot, based on the content identification information attached to the edit instruction; acquires, from the shooting information storage means 202 via the link process control means 201 of the imaging device 200, individual shooting information which enables identification of a situation in which each of a plurality of other contents that are candidates for a link display was shot: and in the same manner, acquires, also from the shooting information storage means 302 via the link process control means 301 of the imaging device 300, individual shooting information which enables identification of a situation in which each of a plurality of other contents that are candidates for a link display was shot.

The process of the shooting information acquisition means 103 acquiring the moving image shooting information and the individual shooting information does not necessarily have to be performed when the edit instruction, the normal reproduction instruction, or the like, is received. The moving image shooting information and the individual shooting information may be preliminarily acquired and held, or alternatively may be acquired during a reproduction of the moving image content.

Here, the moving image shooting information and the individual shooting information are information based on which whether or not the same scene was shot can be determined.

FIG. 2 shows an example of the moving image shooting information.

As shown in FIG. 2, the moving image shooting information includes the content identification information (corresponding to "SHOT MOVING IMAGE NAME" in the drawing), a shooting time (corresponding to "SHOOTING START DATE/TIME" and "SHOOTING END DATE/TIME" in the drawing) at which each content was shot, and a shooting point (corresponding to "SHOOTING POINT" in the drawing) which was acquired at the time of shooting by means of the GPS or the like.

FIG. 3 shows an example of the individual shooting information.

As shown in FIG. 3, the individual shooting information includes content identification information (corresponding to "SHOT IMAGE NAME" in the drawing), a shooting time (corresponding to "SHOOTING DATE/TIME" in the drawing) at which each content was shot, a shooting point (corresponding to "SHOOTING POINT" in the drawing) which was acquired at the time of shooting by means of the GPS or the like, and a storage place (corresponding to "SHOOTING DEVICE" in the drawing) where a corresponding content is stored.

Here, the content to be acquired may be a still image or a moving image.

When the reception means 102 receives an edit instruction for a certain moving image content, the content acquisition means 104 acquires the moving image content from the content storage means 111, based on the content identification information attached to the edit instruction.

For performing the editing process, the moving image reproduction control means 105 reproduces the moving image content acquired by the content acquisition means 104, and causes the content display means 101 to display the moving image content.

Based on the moving image shooting information acquired by the shooting information acquisition means 103, the time output means 106 outputs, as appropriate or at predetermined time intervals, a moving image shooting time corresponding to the moving image content reproduced by the moving image reproduction control means 105.

The retrieval means 107 searches for a content that is supposed to concern the same scene as a scene in the moving image content, by retrieving, from individual shooting information acquired by the shooting information acquisition means 103, such individual shooting information that a time indicated by the individual shooting information is within a predetermined time period including the moving image shooting time that is outputted by the time output means 106 as appropriate or at the predetermined time intervals.

Here, contents supposed to concern the same scene are searched for based only on time information. However, in addition to such a determination method, only the contents of which shooting points as well as shooting times are close to each other may be supposed to concern the same scene. For example, such contents that a straight-line distance between shooting points indicated by position information of the respective contents are equal to or larger than 500 m, may be excluded from targets of the determination of the same scene. Here, as a method for calculating a straight-line distance, a straight-line distance can easily be obtained by: obtaining a straight-line distance in the north-south direction and a straight-line distance in the east-west direction based on differences in latitude and longitude which are indicated by each position information; and obtaining a root mean square of these straight-line distances.

In addition, when the number of individual shooting information retrieved in a retrieval for one predetermined time period reaches a specified value, the retrieval means 107 may: terminate the retrieval at that point of time set the predetermined time period to be a time period corresponding to a time range for which the retrieval has been performed by then; and proceed with a subsequent retrieval. For example, in a case where the predetermined time period is set to be five minutes as a standard, when the shooting time of the reproduced moving image content is exactly 10 o'clock on a certain day, the moving image shooting time indicates exactly 10 o'clock. Accordingly, individual shooting information of other contents that were shot within a time period from 10 o'clock to 10 o'clock, 4 minutes, 59 seconds on the same day are retrieved. Here, a case where the specified value is six is assumed. A retrieval is performed starting from a content of which a shooting time is earliest, and when the number of other retrieved contents is equal to or less than five, a subsequent process is continuously performed for all of the retrieved individual shooting information. At a point of time when the sixth content is retrieved, the retrieval is terminated. If the shooting time of the sixth content is 10 o'clock, 3 minutes, 29 seconds, the predetermined time period is changed from five minutes to three minutes and thirty seconds, and a next retrieval is performed for a time period from 10 o'clock, 3 minutes, 30 seconds to 10 o'clock, 7 minutes.

In this manner, it is not necessary that the predetermined time period, which is a unit of the retrieval, has constantly the same length. The predetermined time period may be dynamically changed. For example, when the number of retrieved contents is large, the predetermined time period which forms a basis is elongated, in order to prevent the moving image from being paused many times. Alternatively, the predetermined time period may be arbitrarily set by an editor.

When one or more individual shooting information is retrieved by the retrieval means 107, the selection request means 108 firstly determines a time (hereinafter referred to as a "link time") for a link display, and notifies the moving image reproduction control means 105 of the link time, to pause the reproduction of the moving image content reproduced by the moving image reproduction control means 105.

Here, when the number of retrieved individual shooting information is one, the link time is the shooting time indicated by the individual shooting information. When the number of retrieved individual shooting information is more than one, the link time is basically the shooting time indicated by, among the plurality of retrieved individual shooting information, individual shooting information including the earliest shooting time. However, the link time is not limited thereto. An average of all the retrieved shooting times, or an average of the earliest and last shooting times may be calculated as the link time.

Then, the selection request means 108 requests a selection of whether or not a link display is to be performed, for each of the other contents corresponding to the one or more retrieved individual shooting information. Also, the selection request means 108 transmits selection request control information, which includes the content identification information for displaying the corresponding other content, to a device indicated by the storage place included in each individual shooting information, so as to make the user select whether or not the corresponding other content is to be displayed in link with the moving image content during a normal reproduction of the moving image content. Herein, an example in which the selection request control information is transmitted to the imaging device 200 is shown.

When the link process control means 201 receives the selection request control information from the selection request means 108, the link process control means 201: extracts, from the content storage means 204, the other content corresponding to the content identification information included in the selection request control information; displays the other content on the display means 203; and also opens an pop-up window urging a selection of whether or not the content is to be displayed in link.

Figure 4:
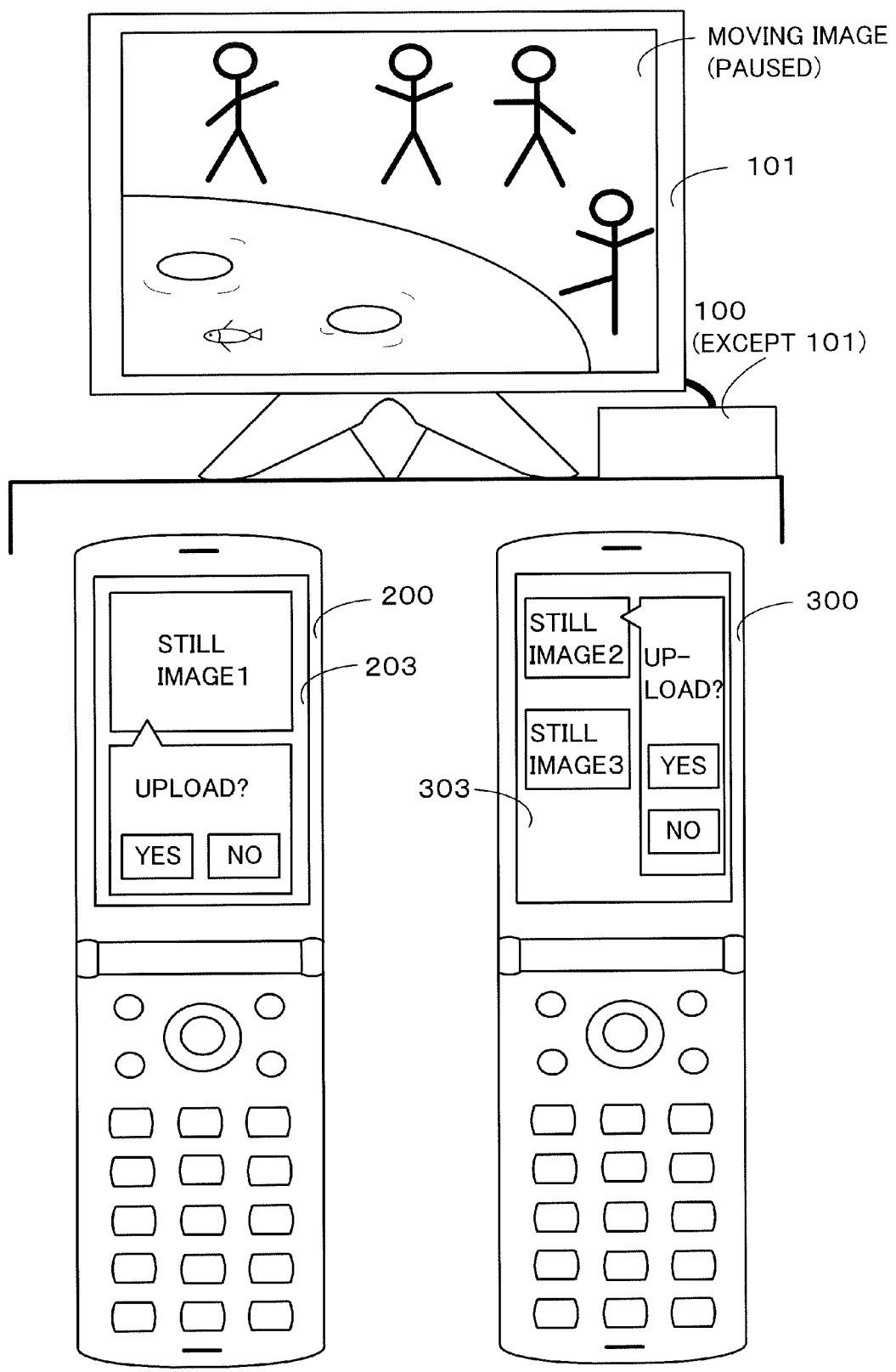
FIG. 4 shows a situation in which, while a plurality of persons are seeing a moving image (in a paused state) displayed on a content display means 101, an operator of an imaging device 200 performs a selection operation through the imaging device 200 and likewise an operator of an imaging device 300 performs a selection operation through the imaging device 300.

FIG. 4 shows a situation in which, while a plurality of persons, such as all family members, are seeing a moving image (in a paused state) displayed on the content display means 101, an operator of the imaging device 200 performs a selection operation through the imaging device 200 and likewise an operator of the imaging device 300 performs a selection operation through the imaging device 300.

Here, the operator of the imaging device 200 refers to a screen which is displayed on the display means 203 by the link process control means 201, and selects, for each image, whether or not the image is to be displayed in link.

Likewise, the operator of the imaging device 300 refers to a screen which is displayed on the display means 303 by the link process control means 301, and selects, for each image, whether or not the image is to be displayed in link.

The content selected to be displayed in link by each of the operators of the imaging device 200 and the imaging device 300 is returned to the content editing apparatus 100 together with selection information which indicates a result that the content is to be displayed. The content selected to be not displayed in link is not returned, and only selection information which indicates a result that the content is not to be displayed is transmitted to the content editing apparatus 100.

The selection request means 108 receives, from the imaging device 200 and the imaging device 300, the selection information indicating the result of the selection, which is performed by each of the operators of the imaging device 200 and the imaging device 300 based on the selection request control information, of whether or not a link display is to be performed. After the selection is performed for all of the other contents corresponding to individual time information retrieved by the retrieval means 107, the selection request means 108 releases the pause, to continue the editing process.

If there is a content for which the selection has not been performed for a long period, an edit operation lags. Therefore, with respect to a content for which the selection has not been performed for a constant time period, it may be determined that the selection that the content is not to be displayed in link has been made, and the editing process may be continued, considering that the selection has been performed for all the contents.

The storage control means 109: acquires the other content selected to be displayed in link, from any of the imaging device 200 and the imaging device 300; associates the other content with the moving image content, together with information indicating a time for a link display; and stores the other content as a mash-up content, in the content storage means 111. Here, the information indicating the time for a link display is, for example, a relative time from a start of the reproduction of the paused moving image content to a pause of the paused moving image content, or alternatively a relative time obtained by converting, by using a moving image time obtained from the moving image shooting information, a time indicated by each individual shooting information into a relative time from a start of the reproduction of the moving image content.

Figures 5, 6:
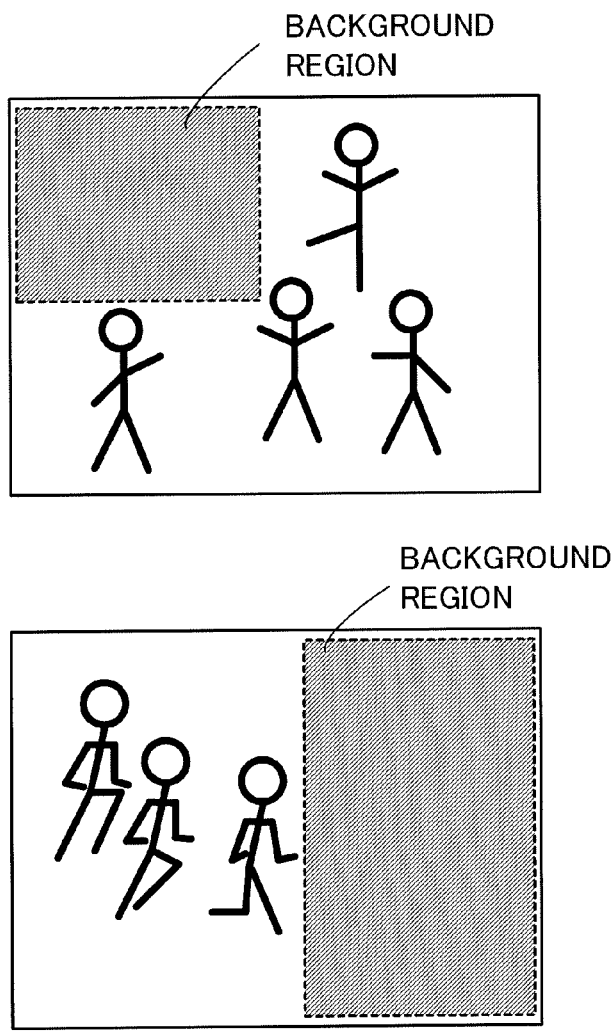
FIG. 5 shows an example of mash-up content control data which is stored in content storage means 111 by storage control means 109.
FIG. 6 shows an example of a background region.

FIG. 5 shows an example of mash-up content control data which is stored in the content storage means 111 by the storage control means 109.

The shooting information storage means 110 stores therein the moving image shooting information of the moving image content.

The content storage means 111 stores therein the moving image content.

In the present embodiment, an other content to be displayed in link is downloaded from an imaging device in which the content is stored, after a permission is obtained from the imaging device. However, a device which gives the permission and a device from which the content is downloaded may not necessarily be the same. For example, a content to be displayed in link may be stored in a memory card, and the memory card may be inserted into a card slot of the content editing apparatus 100. Then, only when a permission for a link display is received from an external device, the content stored in the memory card may be read and displayed in link. Alternatively, for example, a content to be displayed in link may be stored in the content storage means 111. Then, in a case where a permission to use the content is not particularly required, the operator of the content editing apparatus 100 may give a permission for a link display. When the operator of the content editing apparatus 100 gives the permission and an instruction of a link display, the content may be normally read from the content storage means 111 and displayed in link.

Subsequently, a description will be given of a function of each component part in a case where the reception means 102 receives the normal reproduction instruction.

When the reception means 102 receives a normal reproduction instruction for a certain moving image content, the content acquisition means 104 acquires the moving image content from the content storage means 111.

Here, a normal reproduction of the mash-up content, which is reproduced based on the mash-up content control data shown in FIG. 5, is performed.

Furthermore, the moving image reproduction control means 105 reproduces, for the normal reproduction, the moving image content in the mash-up content acquired by the content acquisition means 104, and causes the content display means 101 to display the moving image content.

Furthermore, the time output means 106 outputs, as appropriate, an accumulated time from the start of the reproduction of the moving image content which is being subjected to the normal reproduction by the moving image reproduction control means 105.

The link time determination means 112 determines a time at which the time for a link display, which is indicated by the information shown in the mash-up content control data shown in FIG. 5, is substantially coincident with the accumulated time which is outputted by the time output means 106 as appropriate.

At the time of coincidence which is determined by the link time determination means 112, the image synthesis means 113 synthesizes a corresponding other content and the moving image content which is in the normal reproduction, and displays the contents in link with each other on the same screen of the content display means 101 for a predetermined time period. The image synthesis means 113 includes image analysis means 114 and display pattern determination means 115.

The image analysis means 114 analyzes an image, at the link time, of the moving image content to be edited, and estimates, for example, a region other than a portion recognized as a person or a region in which a motion vector is small, to be a background region. The image analysis means 114 determines that there is no problem in displaying an other content so as to overlap the region in which a person is not displayed, and puts the other content in the background region.

FIG. 6 shows an example of the background region.

The display pattern determination means 115 determines how to display, in link, the other content which is to be synthesized.

FIG. 7 shows display patterns.

Examples of a pattern of the synthesis include: a first method (701 in FIG. 7) in which an other content is simply displayed within the background region; a second method (702 in FIG. 7) in which the size of an other content to be synthesized is adjusted and put in the background region; a third method (703 in FIG. 7) in which, when there are concurrently a plurality of related contents, the plurality of related contents are displayed in the background region in such a manner that the related contents are switched at constant time intervals (in FIG. 7, every one second) using a time division; and a fourth method (704 in FIG. 7) in which the background region is divided into a plurality of regions of which the number is equal to the number of other contents to be synthesized, and the other contents to be synthesized are put in the divided regions, respectively. For example, for synthesizing one other content at one link time: when the size of the other content is smaller than the background region, the first method is adopted in principle; and when the size of the other content is larger than the background region, the second method is adopted. When the size of the other content to be synthesized is extremely small, the other content can be enlarged by using the second method. For synthesizing a plurality of other contents at one link time: when a total size of all other contents is more than approximately 1.5 times the background region, the third method is adopted; and when the total size of all the other contents is equal to or less than 1.5 times the background region, the fourth method is adopted.

The shooting information storage means 202 stores therein individual shooting information concerning a plurality of other contents which are candidates for a link display.

The display means 203 is a small-size display device such as a liquid crystal screen. The display means 203 displays a moving image content or a still image content in accordance with a control performed by the link process control means 201 and the like. In the display means 203, the pop-up window urging the selection of whether or not the content is to be displayed in link is opened. In addition, the display means 203 displays images for operations, such as the operation menus and the alarm display The content storage means 204 stores therein the plurality of other contents which are candidates for a link display.

The shooting means 205 has a function of performing a still image shooting, a continuous shooting, a moving image shooting, and the like. At the same time as each shooting, the shooting means 205 records a shooting time and a shooting point, and generates individual shooting information.

In the present embodiment, the background region is extracted and a display pattern is determined during the normal reproduction. However, these operations may be performed during the editing process. In this case, information indicating the background region and information indicating a display pattern are added to the mash-up content control data, and the editor can arbitrarily change the size of the background region or designate a display pattern later.

FIG. 8 shows an example of the mash-up content control data, in a case where the background region is extracted and a display pattern is determined during the editing process.

In FIG. 8, a section indicating whether or not a link is permitted is added. Using the section, the editor can arbitrarily switch necessity and unnecessity of a link display of each content.

<Operation>

Figure 9:
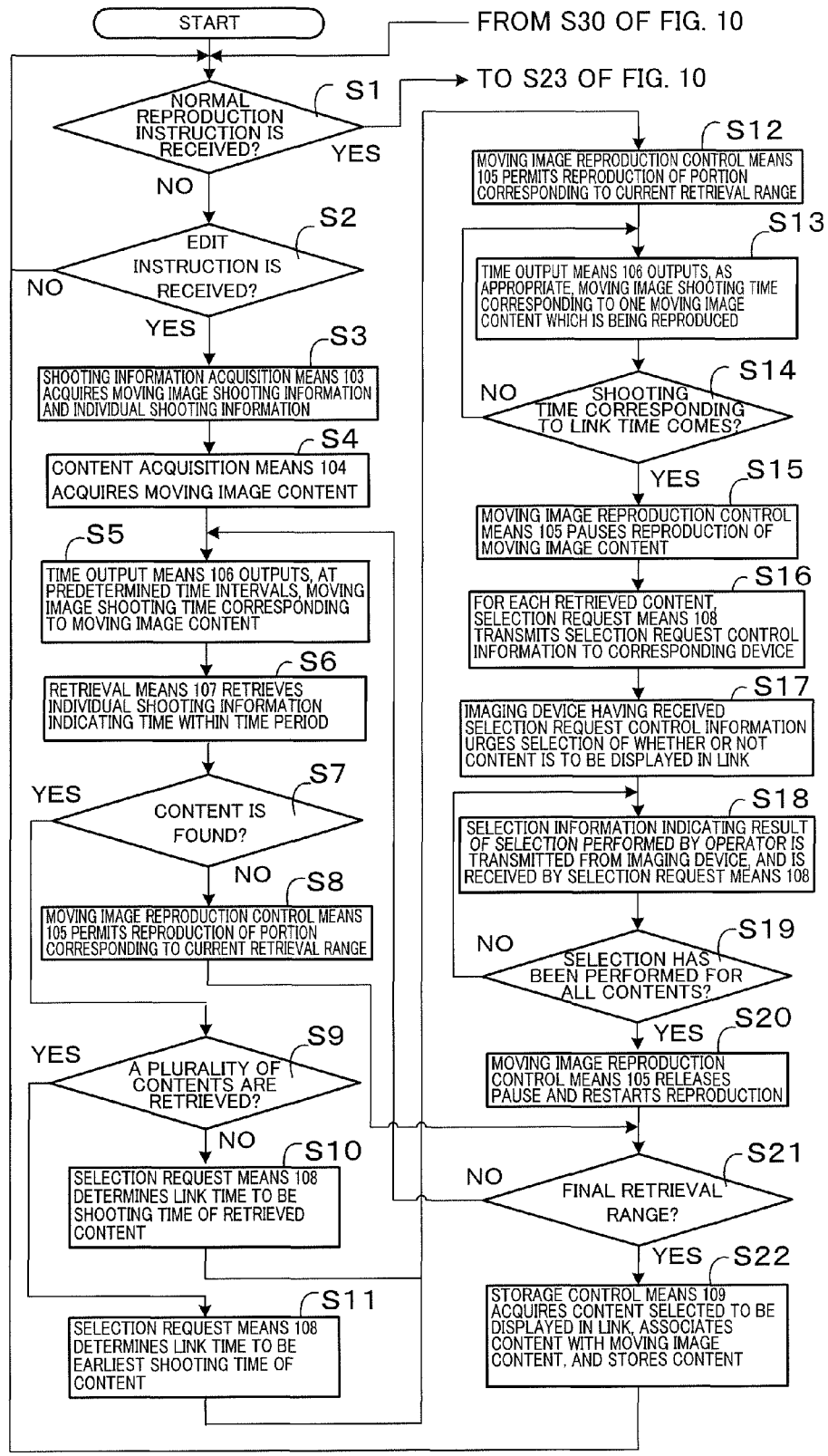
FIG. 9 shows a step sequence of an editing process according to a first embodiment.

FIG. 9 shows a step sequence of the editing process according to the present embodiment.

(1) The process waits until the reception means 102 receives an edit instruction or a normal reproduction instruction for any moving image content from the operator of the content editing apparatus 100 (steps S1 to S2).

(2) When the normal reproduction instruction is received (step S1: YES), the process advances to step S23 of FIG. 10.

(3) When the edit instruction is received (step S2: YES), the shooting information acquisition means 103: acquires moving image shooting information as shown in FIG. 2 from the shooting information storage means 110, based on content identification information attached to the edit instruction; and also acquires individual shooting information as shown in FIG. 3 from the imaging device 200 and the imaging device 300 (step S3). Herein, a description is given on the assumption that the edit instruction for "moving image 1" in FIG. 2 is received.

(4) The content acquisition means 104 acquires the moving image content from the content storage means 111, based on the content identification information attached to the edit instruction (step S4). Here, the content acquisition means 104 acquires a content of which the shot moving image name is "moving image 1".

(5) The time output means 106 outputs, at predetermined time intervals, a moving image shooting time corresponding to the moving image content to be reproduced, based on the moving image shooting information acquired by the shooting information acquisition means 103 (step S5). Here, the time output means 106 firstly outputs "09.4.1/10:20:05" which indicates that the shooting start date/time of "moving image 1" in FIG. 2 is 10 o'clock, 20 minutes, 5 seconds on Apr. 1, 2009.

(6) The retrieval means 107 retrieves, from the individual shooting information acquired by the shooting information acquisition means 103, such individual shooting information that a time indicated by the individual shooting information is within a predetermined time period including the moving image shooting time that is outputted by the time output means 106 as appropriate. Thereby, the retrieval means 107 searches for a content supposed to concern the same scene as a scene in the moving image content (step S6). Here, it is assumed that the predetermined time period is set to be five minutes as a standard, and the retrieval operation is performed for each period of five minutes. Accordingly, in the first retrieval operation, contents shot in a period of five minutes from 10 o'clock, 20 minutes, 5 seconds on Apr. 1, 2009 to 10 o'clock, 25 minutes, 4 seconds on Apr. 1, 2009 are searched for. A second retrieval range is a period of five minutes from 10 o'clock, 25 minutes, 5 seconds on Apr. 1, 2009 to 10 o'clock, 30 minutes, 4 seconds on Apr. 1, 2009. A third retrieval range is a period of five minutes from 10 o'clock, 30 minutes, 5 seconds on Apr. 1, 2009 to 10 o'clock, 35 minutes, 4 seconds on Apr. 1, 2009. A fourth retrieval range is a period of five minutes from 10 o'clock, 35 minutes, 5 seconds on Apr. 1, 2009 to 10 o'clock, 40 minutes, 4 seconds on Apr. 1, 2009. A fifth retrieval range is a period of live minutes from 10 o'clock, 40 minutes, 5 seconds on Apr. 1, 2009 to 10 o'clock, 45 minutes, 4 seconds on Apr. 1, 2009. A sixth retrieval range is a period of five minutes from 10 o'clock, 45 minutes, 5 seconds on Apr. 1, 2009 to 10 o'clock, 50 minutes, 4 seconds on Apr. 1, 2009. A seventh retrieval range is a period of five minutes from 10 o'clock, 50 minutes, 5 seconds on Apr. 1, 2009 to 10 o'clock, 55 minutes, 4 seconds on Apr. 1, 2009. This process is repeatedly performed until 11 o'clock, 30 minutes, 32 seconds on Apr. 1, 2009 at which the shooting ends.

(7) Whether or not a content is found is determined (step S7).

(8) When no content is found (step S7: NO), the moving image reproduction control means 105: permits a reproduction of a portion, which corresponds to the current retrieval range, of the moving image content acquired by the content acquisition means 104, for the editing process; starts a reproduction or, if a reproduction is being performed, continues the reproduction; and causes the content display means 101 to display the portion (step S8). Here, the reproduction is started, for portions of the content of "moving image 1" other than the portions thereof corresponding to the first retrieval range and the seventh retrieval range.

(9) When a content is found (step S7: YES), the selection request means 108 determines whether or not a plurality of contents are retrieved in the current retrieval range (step S9).

(10) When one content is retrieved (step S9: NO), the selection request means 108 determines the link time to be a shooting time of the retrieved content (step S10). Here, the shooting date/time of "still image 1" in FIG. 3 indicates 10 o'clock, 22 minutes, 10 seconds on Apr. 1, 2009, which is within the first retrieval range. Since only this content is within the first retrieval range, the link time is determined to be 10 o'clock, 22 minutes, 10 seconds on Apr. 1, 2009.

(11) When a plurality of contents are retrieved (step S9: YES), the selection request means 108 determines the link time to be the earliest shooting time among shooting times of the plurality of retrieved contents (step S11). Here, the shooting date/time of "still image 2" in FIG. 3 indicates 10 o'clock, 51 minutes, 15 seconds on Apr. 1, 2009, which is within the seventh retrieval range. Moreover, the shooting date/time of "still image 3" in FIG. 3 indicates 10 o'clock, 51 minutes, 16 seconds on Apr. 1, 2009, which is also within the seventh retrieval range. Accordingly, the link time is determined to be 10 o'clock, 51 minutes, 15 seconds on Apr. 1, 2009, which is the earliest shooting time.

(12) The moving image reproduction control means 105: permits a reproduction of a portion, which corresponds to the current retrieval range, of the moving image content acquired by the content acquisition means 104, for the editing process; starts a reproduction or, if a reproduction is being performed, continues the reproduction; and causes the content display means 101 to display the portion (step S12). Here, in the first retrieval range, the reproduction is started from a portion of the content of "moving image 1" shot at 10 o'clock, 20 minutes, 5 seconds on Apr. 1, 2009. In addition, in the seventh retrieval range, the reproduction is started from a portion of the content of "moving image 1" shot at 10 o'clock, 50 minutes, 5 seconds on Apr. 1, 2009.

(13) The time output means 106 outputs, as appropriate, a moving image shooting time corresponding to the moving image content which is being reproduced by the moving image reproduction control means 105, based on the moving image shooting information acquired by the shooting information acquisition means 103 (step S13).

(14) The moving image shooting time outputted by the time output means 106 is monitored, and the process waits until a shooting time corresponding to the link time comes (step S14). Here, in the first retrieval range, the process waits until the moving image shooting time becomes 10 o'clock, 22 minutes, 10 seconds on Apr. 1, 2009. In addition, in the seventh retrieval range, the process waits until the moving image shooting time becomes 10 o'clock, 51 minutes, 15 seconds on Apr. 1, 2009.

(15) At the shooting time corresponding to the link time, the moving image reproduction control means 105 pauses the reproduction of the moving image content (step S15). Here, in the first retrieval range, the content of "moving image 1" is paused at an image shot at 10 o'clock, 22 minutes, 10 seconds on Apr. 1, 2009. In addition, in the seventh retrieval range, the content of "moving image 1" is paused at an image shot at 10 o'clock, 51 minutes, 15 seconds on Apr. 1, 2009

(16) The selection request means 108 transmits, for each of the retrieved contents, selection request control information to a corresponding device indicated by a storage place included in each individual shooting information (step S16). Here, in the first retrieval range, selection request control information for "still image 1" in FIG. 3 is transmitted to the "imaging device 200" shown in the SHOOTING DEVICE section which indicates the storage place where "still image 1" is stored. In addition, in the seventh retrieval range, selection request control information for "still image 2" in FIG. 3 is transmitted to the "imaging device 300" shown in the SHOOTING DEVICE section which indicates the storage place where "still image 2" is stored, and at the same time, selection request control information for "still image 3" in FIG. 3 is transmitted to "imaging device 300" shown in the SHOOTING DEVICE section which indicates the storage place where "still image 3" is stored.

(17) The link process control means of the imaging device which has received the selection request control information urges the operator to select whether or not a content is to be displayed in link. In detail, when the link process control means 201 receives the selection request control information from the selection request means 108, the link process control means 201: extracts, from the content storage means 204, the other content corresponding to the content identification information which is included in the selection request control information; and displays the other content on the display means 203, and also opens an pop-up window urging a selection of whether or not this content is to be displayed in link. In the same manner, when the link process control means 301 receives the selection request control information from the selection request means 108, the link process control means 301: extracts, from the content storage means 304, the other content corresponding to the content identification information which is included in the selection request control information; and displays the other content on the display means 303, and also opens an pop-up window urging a selection of whether or not this content is to be displayed in link (step S17). Here, in the first retrieval range, the link process control means 201: receives the selection request control information for "still image 1"; extracts the content of "still image 1" from the content storage means 204; and, as shown in FIG. 4, displays the content of "still image 1" on the display means 203, and also opens an pop-up window saying "UPLOAD?". In addition, in the seventh retrieval range, the link process control means 301: receives the selection request control information for "still image 2" and extracts the content of "still image 2" from the content storage means 304, and at the same time, receives the selection request control information for "still image 3" and extracts the content of "still image 3" from the content storage means 304; and, as shown in FIG. 4, displays the content of "still image 2" and the content of "still image 3" on the display means 303, and also opens an pop-up window saying "UPLOAD?" sequentially for "still image 2" and "still image 3".

(18) In the link process control means 201 and the link process control means 301, each operator selects whether or not the content is to be displayed in link, and selection information indicating a result of the selection performed by the operator is transmitted. The selection information is received by the selection request means 108. A content selected to be displayed in link is transmitted together with the selection information indicating the result that the content is to be displayed in link (step S18). Here, the operator of each of the imaging device 200 and the imaging device 300 can upload only image data to be displayed in link at an appropriate link time, merely by performing an operation of permitting the upload. Moreover, each operator may permit an upload of only a content desired to be displayed in link. For example, each operator may select a content including a better picture.

Here, it is assumed that, in the first retrieval range; the operator of the imaging device 200 selects to display the content of "still image 1" in link, and transmits the content of "still image 1" together. In addition, it is assumed that, in the seventh retrieval range, the operator of the imaging device 300 selects to display both the content of "still image 2" and the content of "still image 3" in link, and transmits both the content of "still image 2" and the content of "still image 3" together.

It should be noted that both the imaging device 200 and the imaging device 300 may be requested to upload image data at the same time.

(19) The process waits until the selection is performed and the selection request means 108 receives the selection information for all the other contents corresponding to retrieved individual time information in the one-retrieval range (step S19).

(20) When the selection is performed and the selection information is received for all the contents to be selected (step S19: YES), the moving image reproduction control means 105 releases the pause, and restarts the reproduction (step S20). Here, in the first retrieval range and the seventh retrieval range, the pause is released and the reproduction is restarted.

(21) Based on the shooting end date/time, whether or not the current retrieval range is the final retrieval range is determined (step S21). When the current retrieval range is not the final retrieval range, the process returns in order to perform a retrieval in the next retrieval range.

(22) When the current retrieval range is the final retrieval range, the storage control means 109: acquires the other content selected to be displayed in link, from the imaging device 200 and the imaging device 300; associates the other content with the moving image content, together with information indicating a time for a link display; and stores the other content as a mash-up content, in the content storage means 111. Then, the process returns to a state of waiting an instruction from the operator of the content editing apparatus 100 (step S22).

Figure 10:
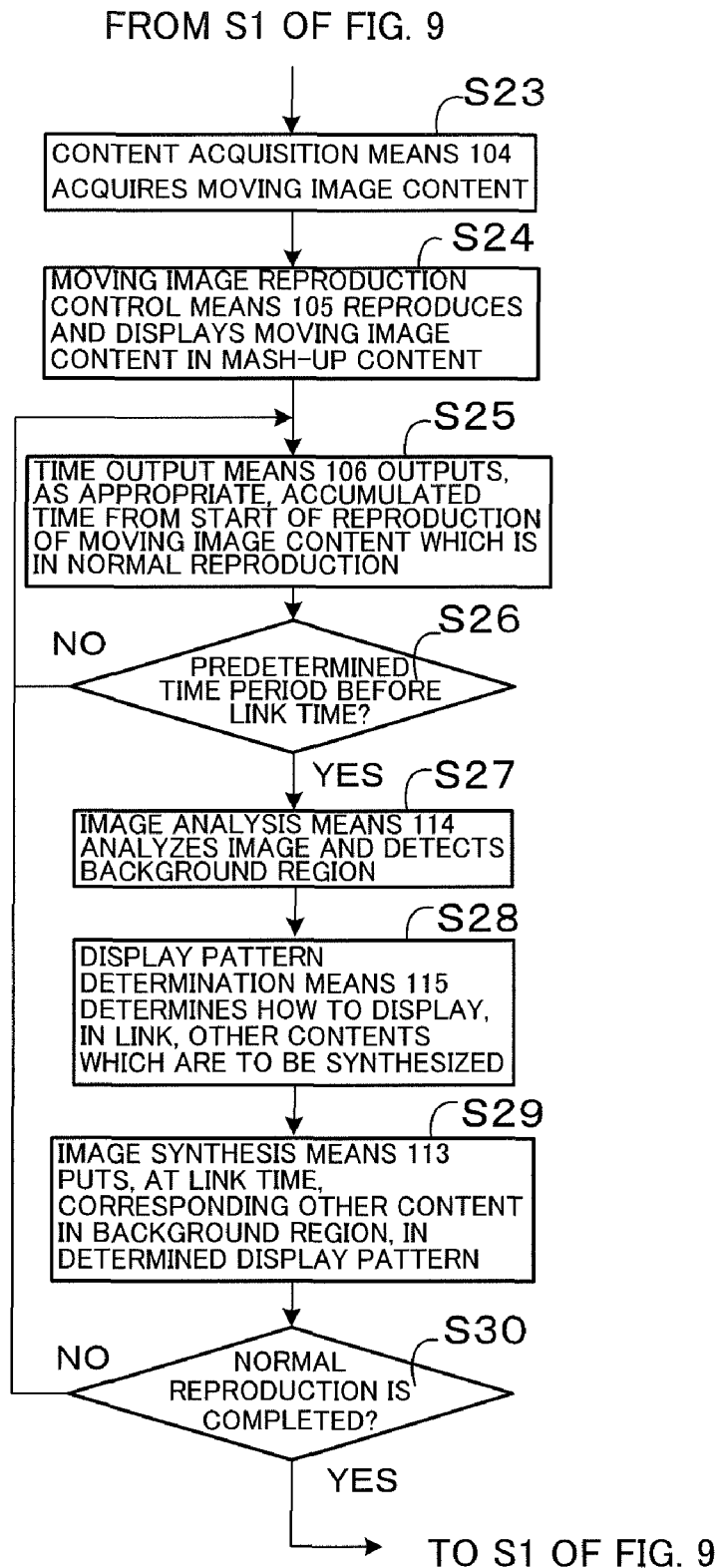
FIG. 10 shows a step sequence of a normal reproduction process according to the present embodiment.

FIG. 10 shows a step sequence of a normal reproduction process according to the present embodiment.

Step S23 and subsequent steps concern the step sequence of the normal reproduction process.

(23) When the normal reproduction instruction is received (step S1: YES), the content acquisition means 104 acquires the moving image content from the content storage means 111 (step S23). Here, a normal reproduction of the mash-up content, which is reproduced based on the mash-up content control data shown in FIG. 5, is performed.

(24) The moving image reproduction control means 105 reproduces, for the normal reproduction, the moving image content in the mash-up content acquired by the content acquisition means 104, and causes the content display means 101 to display the moving image content (step S24).

(25) The time output means 106 outputs, as appropriate, an accumulated time from the start of the reproduction of the moving image content which is being subjected to the normal reproduction by the moving image reproduction control means 105 (step S25).

(26) The process waits until a predetermined time period before the link time (step S26). In detail, the link time determination means 112: determines a time at which the link time, which is indicated by information shown in the mash-up content control data shown in FIG. 5, is substantially coincident with the accumulated time which is outputted by the time output means 106 as appropriate; and outputs an output signal the predetermined time period before the link time, in consideration of a delay time due to processing. Here, the indication of "00:02:05" in the uppermost row in the LINK TIME section in FIG. 5 represents a time two minutes and five seconds after the start of the reproduction of "moving image 1". Therefore, in this case, the link time is "two minutes and five seconds after the start". When the predetermined time period is five seconds, the output signal is outputted for starting the process, at a time two minutes and zero second after the start of the reproduction. Also, the indication of "00:31:10" in the second and third rows in the LINK TIME section in FIG. 5 represents a time 31 minutes and 10 seconds after the start of the reproduction of "moving image 1". Therefore, in this case, the link time is "31 minutes and 10 seconds after the start". When the predetermined time period is five seconds, the output signal is outputted for starting the process, at a time 31 minutes 5 seconds after the start of the reproduction.

(27) When it is the predetermined time period before the link time (step S26: YES), the image analysis means 114 analyzes an image, at the link time, of the moving image content to be edited, and detects a background region (step S27).

(28) The display pattern determination means 115 determines how to display, in link, the other contents which are to be synthesized, based on the number of the other contents to be synthesized, the size of the background region, a total size of the other contents to be synthesized, and the like (step S28). Here, for example, a content to be synthesized at the link time "two minutes and five seconds after the start" is only "still image 1". Therefore, it is determined that the first method, in which the content is simply displayed in the background region as shown in 701 of FIG. 7, is to be adopted. The number of contents to be synthesized at the link time "31 minutes and 10 seconds after the start" is two, namely, "still image 2" and "still image 3". When it is determined that the size of the background region is somewhat smaller than the total size of "still image 2" and "still image 3", it is determined that the second method, in which the sizes of the other contents to be synthesized are adjusted and put in the background region as shown in 702 of FIG. 7, is to be adopted.

(29) The image synthesis means 113 puts, at the link time, the corresponding other content in the background region detected by the image analysis means 114, in the display pattern determined by the display pattern determination means 115 (step S29).

(30) Whether or not the normal reproduction is completed is determined (step S30). When the normal reproduction is not completed, the normal reproduction process is continued. When the normal reproduction is completed, the process returns to the state of waiting an instruction from the operator of the content editing apparatus 100.

In the present embodiment, the process of determining the link time is performed for the predetermined time period, as a unit, in the shooting time of the moving image content; and while portions of the moving image content for which the process has been completed are sequentially reproduced, the subsequent link time is determined concurrently. Thereby, a processing time is apparently shortened. However, a procedure of the process is not particularly limited thereto. For example, the determination of the link time may be performed completely concurrently during the reproduction of the moving image content, or alternatively the determination of all the link times may be completed before the reproduction of the moving image content is started.

In the present embodiment, the case where a still image stored in an other imaging device is displayed in link with a moving image during a reproduction of the moving image has been described. However, contents to be displayed in link are not limited. The present invention is applicable to a case where a moving image is displayed in link with a moving image during a reproduction of the moving image.

In the present embodiment, a link display in which a moving image stored in a content editing apparatus and a content stored in an imaging device are linked has been described. However, a device in which the content is stored is not limited. The present invention is also applicable to a case where, during a reproduction of a moving image acquired from an imaging device, a content in a content editing apparatus or a content acquired from another imaging device is displayed in link with the moving image.

Also, a program capable of causing a computer to execute an operation as in the present embodiment may be recorded in a computer-readable recording medium, and the recording medium can be distributed and traded. In addition, the program can be distributed and traded via a network or the like. Also, the program can be presented to a user, by being displayed on a display device or printed.

Here, the computer-readable recording medium is a removable recording medium such as a flexible disk, a CD, an MO, a DVD, and a memory card, a fixed recording medium such as a hard disk and a semiconductor memory, or the like. The computer-readable recording medium is not particularly limited.

CONCLUSION

As described above, in the content editing apparatus according to the first embodiment, a plurality of contents are, while being selected and deselected, edited such that selected contents are appropriately associated with each other so as to be simultaneously reproduced, in order that contents including the same object can be simultaneously viewed as one collective content.

In addition, the content editing apparatus according to the first embodiment inquires of an external device about whether or not a link display can be performed, and unless a permission is obtained from the external device, the content editing apparatus does not display, on a main body of the editing apparatus, a content which is a candidate for a link display. For example, in a case where a photographer hopes to avoid being laughed at for a badly shot photograph, a case where contents including different objects were shot at the same time, and a case where a highly-confidential content which causes a disadvantage when seen by someone is managed, a manager such as a photographer or an authorized person can responsibly make a final determination of whether or not a link display can be performed.

Moreover, in the content editing apparatus according to the first embodiment, all of the plurality of contents that were shot within the time period including the moving image shooting time can be retrieved, and collectively edited while the moving image content is paused.

Furthermore, a display of the reproduced content at the link time is analyzed and a link display pattern is determined. Thereby, in a reproduction process using a link display of a plurality of contents, an optimal link display pattern can be adopted.

INDUSTRIAL APPLICABILITY

The content editing apparatus according to the present invention can, relatively easily, synthesize a plurality of related contents and simultaneously display the contents on the same screen, and therefore is usable particularly as a home-use content editing equipment. In addition, since the content editing apparatus according to the present invention has excellent usability, the content editing apparatus is also suitably used as an extended function of, for example, a receiver device or a record/reproduction device of a television, a set top box, or the like, by being built therein.

REFERENCE SIGNS LIST

- 10 content editing system
- 100 content editing apparatus
- 101 content display means
- 102 reception means
- 103 shooting information acquisition means
- 104 content acquisition means
- 105 moving image reproduction control means
- 106 time output means
- 107 retrieval means
- 108 selection request means
- 109 storage control means
- 110 shooting information storage means
- 111 content storage means
- 112 link time determination means
- 113 image synthesis means
- 114 image analysis means
- 115 display pattern determination means
- 200 imaging device
- 201 link process control means
- 202 shooting information storage means
- 203 display means
- 204 content storage means
- 205 shooting means
- 300 imaging device
- 301 link process control means
- 302 shooting information storage means
- 303 display means 304 content storage means
305 shooting means

The invention claimed is:

1. A content editing apparatus which preliminarily associates an other content with a moving image content in an editing process, such that the other content is displayed in link with the moving image content in a normal reproduction of the moving image content, the content editing apparatus comprising:
    an acquisition section that acquires, for the editing process, moving image shooting information which at least identifies a time at which the moving image content was shot, individual shooting information which at least indicates a time at which each of a plurality of other contents which are candidates for a link display was shot, and the moving image content;
    a moving image reproduction control section that, for the editing process, reproduces the moving image content acquired by the acquisition section, and causes the moving image content to be displayed on a display device which is provided in the outside and connected to the content editing apparatus, or is built in the content editing apparatus;
    a time output section that outputs a moving image shooting time corresponding to the moving image content reproduced by the moving image reproduction control section, based on the moving image shooting information acquired by the acquisition section;
    a retrieval section that retrieves, from the individual shooting information acquired by the acquisition section, such individual shooting information that an individual time indicated by the individual shooting information is within a predetermined time period including the moving image shooting time outputted by the time output section;
    a selection request section that: pauses, at a time for a link display, the reproduction of the moving image content reproduced by the moving image reproduction control section, when one or more individual shooting information is retrieved by the retrieval section; makes a user select whether or not an other content, which corresponds to each of the retrieved one or more individual shooting information, is to be displayed in link with the moving image content in the normal reproduction of the moving image content; and releases the pause after whether or not a link display is to be performed is determined for all other contents corresponding to the individual shooting information retrieved by the retrieval section; and
    a storage section that acquires an other content selected to be displayed in link by the selection request section, and stores the other content in association with the moving image content, together with information indicating the time for a link display.

2. The content editing apparatus according to claim 1, wherein
    when the number of individual shooting information retrieved in a retrieval for one predetermined time period reaches a specified value, the retrieval section: terminates the retrieval at that point of time; sets the predetermined time period to be a time period corresponding to a time range for which the retrieval has been performed by then; and proceeds with a subsequent retrieval.

3. The content editing apparatus according to claim 1, wherein
    an external device that records the other content and includes an own display section is communicably connected to the content editing apparatus,
    the acquisition section acquires the individual shooting information from the external device,
    the selection request section: transmits, to the external device, control information for displaying, on the display section included in the external device, an image for which a selection of whether or not a link display is to be performed is requested, and a corresponding other content; and receives, from the external device, selection information indicating a result of the selection, which is performed by a user of the external device based on the control information, of whether or not a link display is to be performed, and
    the storage section acquires the other content selected to be displayed in link, from the external device.

4. The content editing apparatus according to claim 1, wherein
    the acquisition section further acquires, for the normal reproduction, the moving image content with which the other content is associated together with the information indicating the time for a link display,
    the moving image reproduction control section further reproduces the moving image content and causes the display device to display the moving image content, for the normal reproduction, and
    the content editing apparatus further includes:
        a time detection section that detects a time for a link display, based on the acquired information indicating the time for a link display, while counting a reproduction time of the moving image content which is in the normal reproduction by the moving image reproduction control section; and
        an image synthesis section that at the time for a link display detected by the time detection section, synthesizes the other content, which is stored in association with the corresponding moving image shooting time, and the moving image content, which is subjected to the normal reproduction by the moving image reproduction control section; and displays the other content and the moving image content in link with each other on the same screen of the display device, for a predetermined time period.

5. The content editing apparatus according to claim 4, wherein
    the image synthesis section estimates a background region in the moving image content to be synthesized, which is in the normal reproduction, and puts the other content to be synthesized, in the background region.

6. The content editing apparatus according to claim 5, wherein
    the image synthesis section puts the other content to be synthesized, while adjusting the size of the other content to be synthesized, such that the size of the other content does not exceed the size of the background region.

7. The content editing apparatus according to claim 5, wherein
    when there are concurrently a plurality of other contents to be synthesized, the image synthesis section puts the other contents to be synthesized, while switching the other contents at constant time intervals using a time division, such that the size of the other contents does not exceed the size of the background region.

8. The content editing apparatus according to claim 5, wherein when there are concurrently a plurality of other contents to be synthesized, the image synthesis section: divides the background region into a plurality of regions of which the number is equal to the number of the other contents to be synthesized; and puts the other contents to be synthesized, in the divided regions, respectively.

9. A content editing method in a content editing apparatus which preliminarily associates an other content with a moving image content in an editing process, such that the other content is displayed in link with the moving image content in a normal reproduction of the moving image content, the content editing method including:

an acquisition step of acquiring, for the editing process, moving image shooting information which at least identifies a time at which the moving image content was shot, individual shooting information which at least indicates a time at which each of a plurality of other contents which are candidates for a link display was shot, and the moving image content;

a moving image reproduction control step of, for the editing process, reproducing the moving image content acquired in the acquisition step, and causing the moving image content to be displayed on a display device which is provided in the outside and connected to the content editing apparatus, or is built in the content editing apparatus;

a time output step of outputting a moving image shooting time corresponding to the moving image content reproduced in the moving image reproduction control step, based on the moving image shooting information acquired in the acquisition step;

a retrieval step of retrieving, from the individual shooting information acquired in the acquisition step, such individual shooting information that an individual time indicated by the individual shooting information is within a predetermined time period including the moving image shooting time outputted in the time output step;

a selection request step of: pausing, at a time for a link display, the reproduction of the moving image content reproduced in the moving image reproduction control step, when one or more individual shooting information is retrieved in the retrieval step; making a user select whether or not an other content, which corresponds to each of the retrieved one or more individual shooting information, is to be displayed in link with the moving image content in the normal reproduction of the moving image content; and releasing the pause after whether or not a link display is to be performed is determined for all other contents corresponding to individual time information retrieved in the retrieval step; and a storage step of acquiring an other content selected to be displayed in link in the selection request step, and storing the other content in association with the moving image content, together with information indicating the time for a link display.

10. A non-transitory computer readable storage medium storing a content editing program executable by a content editing apparatus which preliminarily associates an other content with a moving image content in an editing process, such that the other content is displayed in link with the moving image content in a normal reproduction of the moving image content, the content editing program causing the content editing apparatus to perform:

an acquisition step of acquiring, for the editing process, moving image shooting information which at least identifies a time at which the moving image content was shot, individual shooting information which at least indicates a time at which each of a plurality of other contents which are candidates for a link display was shot, and the moving image content;

a moving image reproduction control step of, for the editing process, reproducing the moving image content acquired in the acquisition step, and causing the moving image content to be displayed on a display device which is provided in the outside and connected to the content editing apparatus, or is built in the content editing apparatus;

a time output step of outputting a moving image shooting time corresponding to the moving image content reproduced in the moving image reproduction control step, based on the moving image shooting information acquired in the acquisition step;

a retrieval step of retrieving, from the individual shooting information acquired in the acquisition step, such individual shooting information that an individual time indicated by the individual shooting information is within a predetermined time period including the moving image shooting time outputted in the time output step;

a selection request step of: pausing, at a time for a link display, the reproduction of the moving image content reproduced in the moving image reproduction control step, when one or more individual shooting information is retrieved in the retrieval step; making a user select whether or not an other content, which corresponds to each of the retrieved one or more individual shooting information, is to be displayed in link with the moving image content in the normal reproduction of the moving image content; and releasing the pause after whether or not a link display is to be performed is determined for all other contents corresponding to individual time information retrieved in the retrieval step; and a storage step of acquiring an other content selected to be displayed in link in the selection request step, and storing the other content in association with the moving image content, together with information indicating the time for a link display.

* * * * *